J. P. ZIMMERMAN.
End-Gate for Wagons.

No. 219,890. Patented Sept. 23, 1879.

Attest:
Geo. T. Smallwood Jr.
Walter Allen

Inventor:
John P. Zimmerman
By Knight Bros
attys.

2 Sheets—Sheet 2.

J. P. ZIMMERMAN.
End-Gate for Wagons.

No. 219,890.  Patented Sept. 23, 1879.

Attest:
Geo. T. Smallwood Jr.
Walter Allen

Inventor:
John P. Zimmerman
By Knight Bros
Attys.

UNITED STATES PATENT OFFICE.

JOHN P. ZIMMERMAN, OF PERRY, KANSAS.

IMPROVEMENT IN END-GATES FOR WAGONS.

Specification forming part of Letters Patent No. 219,890, dated September 23, 1879; application filed July 26, 1879.

*To all whom it may concern:*

Be it known that I, JOHN P. ZIMMERMAN, of Perry, in the county of Jefferson and State of Kansas, have invented a new and useful Improvement in End-Gates for Wagons, of which the following is a specification.

The subject of this invention is an end-gate or tail-gate consisting of three leaves, one working on horizontal pivots, and adapted to be turned down in continuation of the bottom of the wagon-bed, the other two working on vertical hinges, and adapted to be turned outward, so as to form sides of the extended bottom. When in this open position the parts interlock, supporting the bottom extension firmly in position for a shovel-board.

When closed the parts are secured together by means of a single key passing through a staple extending outward from the back of the upturned bottom leaf, through the outer one of the lapped side wings, so as to form a staunch and secure back to the bed, the heels of the side wings engaging with flanges or shoulders of a plate at top of the inside leaf, so as to draw the sides together and dispense with the need of a rod.

When the parts are removed, either separately or together, which is effected with great ease, there are no separate bolts, rods, or other loose parts which can be lost.

The improvements particularly consist in providing the front of the three leaves, which extends completely across the wagon-bed, with a plate or bar having lips, and forming the folding rear leaves with shoulders, engaging with said lips when closed, and serving, together with the hinges of said rear plates, to keep the sides from spreading without the use of a rod; second, in providing the inner faces of the rear leaves with staples to receive the aforesaid lips of the front leaf, so as to support it when turned down as a shovel-board.

In order that the invention may be fully understood, I will proceed to describe it with reference to the accompanying drawings, in which—

Figure 1:
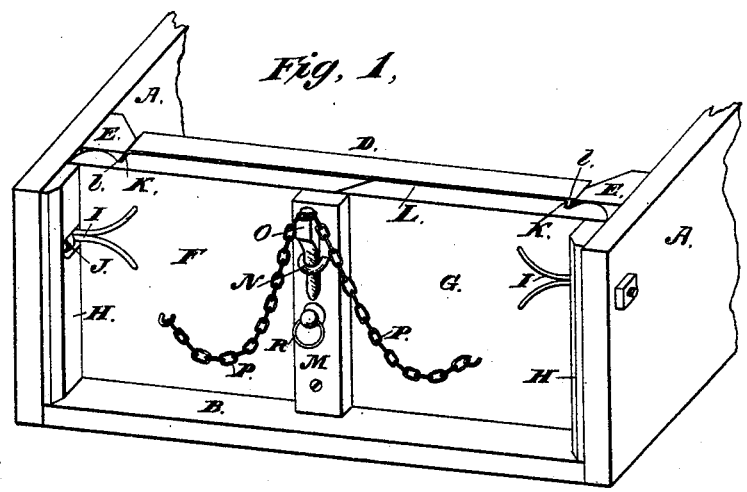
Figure 2:
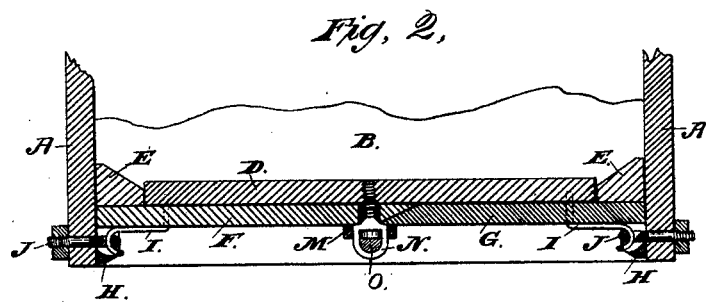
Figure 3:
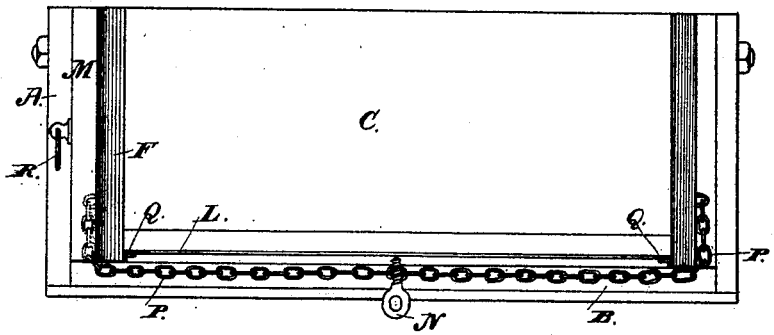
Figure 4:
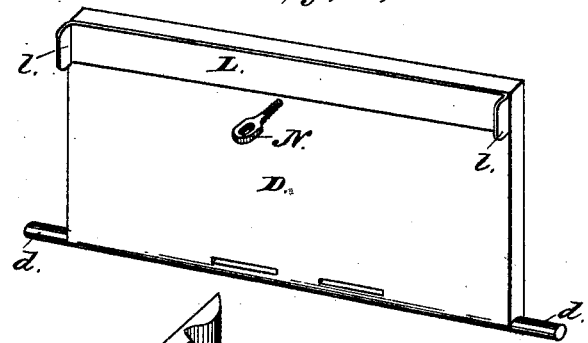
Figure 5:
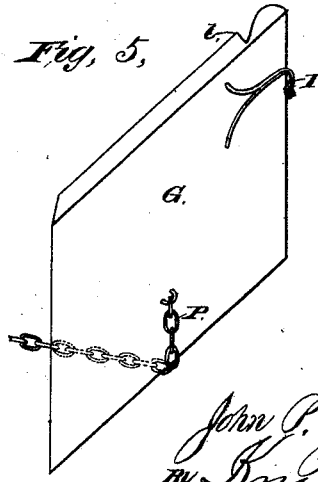

Figure 1 is a perspective view of my end-gate closed. Fig. 2 is a horizontal section of the same. Fig. 3 is a rear view, showing the gate open. Fig. 4 is a perspective view of the inner leaf of the gate detached, and Fig. 5 is a perspective view of the two outer wings.

A A, B, and C represent, respectively, the sides, bottom, and front of a wagon-bed of common form.

D is the inner wing or leaf of my improved tail-gate, pivoted by gudgeons $d\ d$ within notches at the bottom of vertical cleats E within the sides A A.

F G are the outer leaves, each being one-half of the length of the width of the wagon-bed, and fitting at their outer extremities between the cleats E E and rear cleats, H H, between which and the cleats E E the necessary space is left to form suitable grooves or recesses to securely retain the ends of the leaves F G against back-pressure when in closed position. The leaves F G are also hinged by means of hooks I I, engaging in staples or eyes J, bolted to the inner faces of the bed-sides, with recesses prepared for them in the cleats H H. On the front face of the leaves F G are shoulders K K, engaging with lips or flanges $l\ l$ at the extremities of a plate, L, extending horizontally across the rear face of the front leaf, D, close to its upper edge.

The meeting ends of the leaves F G fit together with a scarf-joint, as shown, the leaf F being further provided with a batten, M, which fits over the edge of the leaf G when closed, and is perforated to receive a staple, N, projecting from the back of the front leaf, D, and receiving a pin or key, O, which is preferably attached to the center of a loose chain, P, fixed at its ends to the respective leaves F G, so as to fix the whole securely together. In this position it will be observed that the shoulders K of the leaves F G engage with the lips $l$ of the plate L, while the hooks I on the back of the leaves F G engage with the eyes J in the sides A A, so as to bind the said sides firmly together without the use of a rod.

A ring, R, may be applied to the batten of the leaf F, for the purpose of drawing the leaves F G outward when the key is removed.

When the tail-gate is to be opened, the key O is removed, the leaves F G turned out on their hinges to the limit allowed by the chain P, and the front leaf, D, turned down to the position shown in Fig. 3, the projecting lips $l$ $l$ of the plate L engaging in staples Q, prepared for them near the lower edges of the leaves F G, so as to support the leaf D securely in horizontal position, and constitute a further brace for the side leaves, F G. In this position my tail-gate forms a most convenient and staunch shovel-board, and when it is to be closed this is effected instantly by restoring the parts to their former position.

An additional advantage in the invention consists in the entire absence of any loose parts liable to be mislaid or lost.

I also construct my device to serve as a shelving end-gate or combine a shelving end-gate with the inner leaf of my gate above described.

Having described my invention, I claim as new and desire to secure by Letters Patent—

1. The combination, with the sides A A, of the leaves F G, having hooks I I, engaging with the sides, and shoulders K, engaging with lips $l\ l$ of the horizontal plate L, so as to lock the sides together, as described.

2. The combination of the leaves D F G, plate L, with lips $l\ l$, and the staples Q on the faces of the leaves F G, for supporting the leaf D as a shovel-board.

JOHN P. ZIMMERMAN.

Witnesses:
 J. H. SPURLECH,
 JOS. DOUGLASS.